Oct. 3, 1950

W. H. PALMER ET AL 2,524,075

NETWORK FOR BALANCING THE SEA RETURN
IMPEDANCE OF SUBMARINE CABLES

Filed Feb. 6, 1947

*INVENTORS*
W. H. PALMER
P. H. WELLS

BY

*M J Reynolds*

ATTORNEY

Oct. 3, 1950 — W. H. PALMER ET AL — 2,524,075
NETWORK FOR BALANCING THE SEA RETURN
IMPEDANCE OF SUBMARINE CABLES
Filed Feb. 6, 1947 — 2 Sheets-Sheet 2

INVENTORS
W. H. PALMER
P. H. WELLS
BY M. J. Reynolds
ATTORNEY

Patented Oct. 3, 1950

2,524,075

UNITED STATES PATENT OFFICE 2,524,075

NETWORK FOR BALANCING THE SEA RETURN IMPEDANCE OF SUBMARINE CABLES

William H. Palmer, Summit, and Philip H. Wells, Chatham, N. J., assignors to The Western Union Telegraph Company, New York, N. Y., a corporation of New York Application February 6, 1947, Serial No. 726,938

9 Claims. (Cl. 178—44)

This invention relates to submarine cable systems, and in particular to a method of balancing non-loaded cables arranged for two-way operation in duplex systems.

In view of the very large investment involved in the laying of a submarine cable, and in the maintenance both of the cable itself and the specialized terminal equipment with which it is provided, it is essential to obtain the greatest possible message carrying capacity from such cables. For this reason it is customary to duplex the cables whereby they may be operated simultaneously in both directions. The duplexing is accomplished by incorporating the cable into a Wheatstone bridge circuit which includes an artificial line arranged to simulate the real cable. This invention relates to an improvement in such artificial lines.

The conventional artificial line used to balance a non-loaded submarine cable is comprised of series resistances, with shunt condensers located at systematically distributed points along the resistances. This combination may be made to balance with a fair degree of accuracy the resistance and capacity of the cable with respect both to impedance and propagation constant. The cable, however, possesses further property which must be considered in providing a satisfactory duplicate of the cable for duplex working. This property is commonly known as "sea return impedance" and is determined by the characteristics of the current return path which comprises the cable armor wires and the surrounding sea water. This sea return impedance contains resistance and inductance components, both of which are variable with frequency. This frequency variable effect is a consequence of the manner in which the return currents divide between the joint armor wire and sea water paths according to frequency. For the high order of balance required in modern cable operation it is essential that this variable sea return impedance be simulated in the artificial line.

In the past various methods have been proposed for balancing the inductance and resistance of the sea return path. These include inductance coils and frequency variable inductance networks distributed along the artificial line, resistances of identical value located in series with artificial line condensers, and the introduction of irregular adjustments in the artificial line resistances and condensers in such a manner as to simulate an inductive effect. These prior solutions have not been satisfactory for a number of reasons. Among them are the added complexity and cost of the artificial line, the inadequacy of the frequency range of the balance and, in some cases, the lack of balance in respect to the propagation constant.

We have discovered an improved means for balancing the sea return impedance of submarine cables which is extremely simple, is inexpensive, and is accurate over a wide frequency range. The improved means is readily introduced into an existing artificial line without increasing its complexity, is stable, and is substantially without influence on the propagation constant. While the artificial line so equipped is not particularly critical in adjustment, the balancing arrangement for each type of cable is unique and must be individually developed for each case.

A major object of the invention is to provide an artificial line which will accurately balance a submarine cable.

Another object is to balance the sea return impedance of a submarine cable.

An additional object is to provide means in an artificial line for balancing the sea return impedance of a submarine cable without influencing the propagation constant of the artificial line.

A still further object is to provide a simple, inexpensive and easily introduced modification of an artificial line for a submarine cable which will simulate the sea return impedance of the cable.

Other objects of the invention will appear hereinafter from a study of the proposed improved method of balancing submarine cables.

While the invention is described with particular application to non-loaded submarine cables, it may also have application to loaded submarine cables as well as to other types of transmission lines.

In order to explain the invention:

Figure 4:
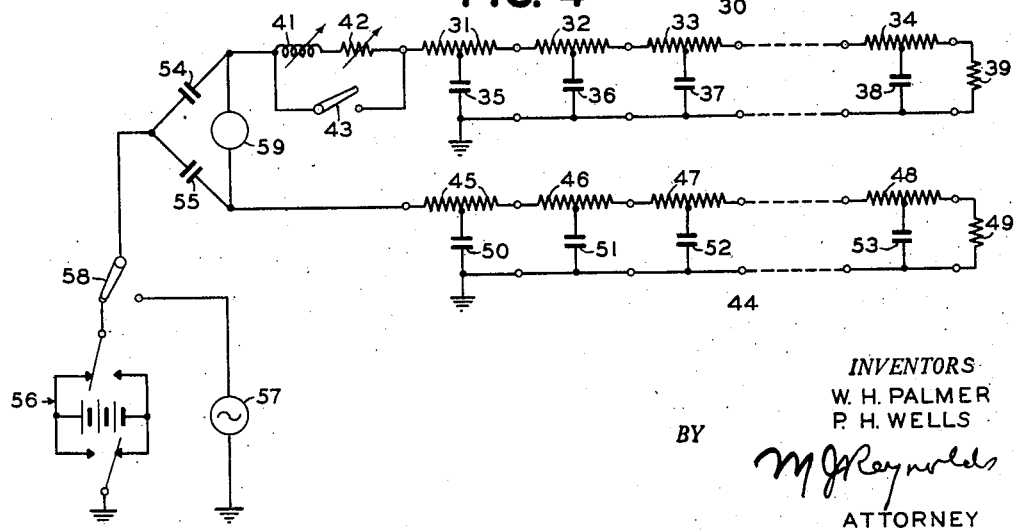
Figure 3:
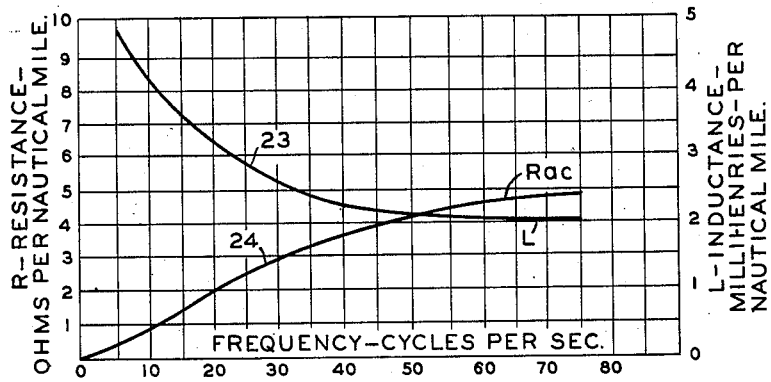
Figure 5:
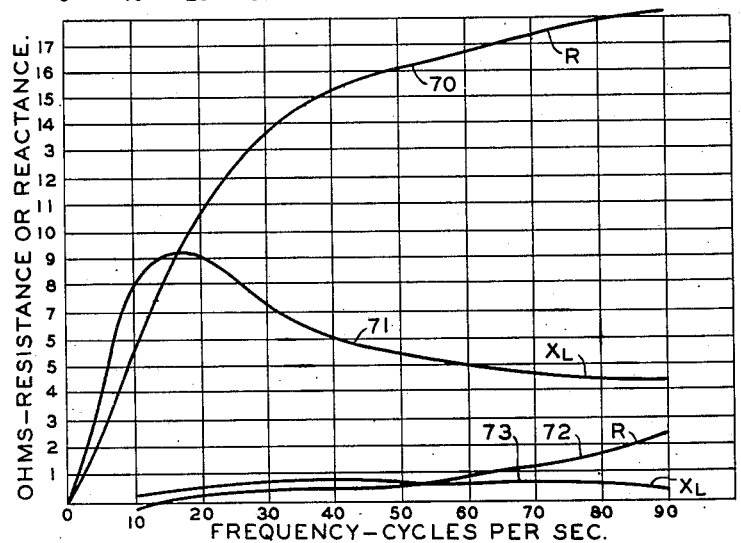
Figure 6:
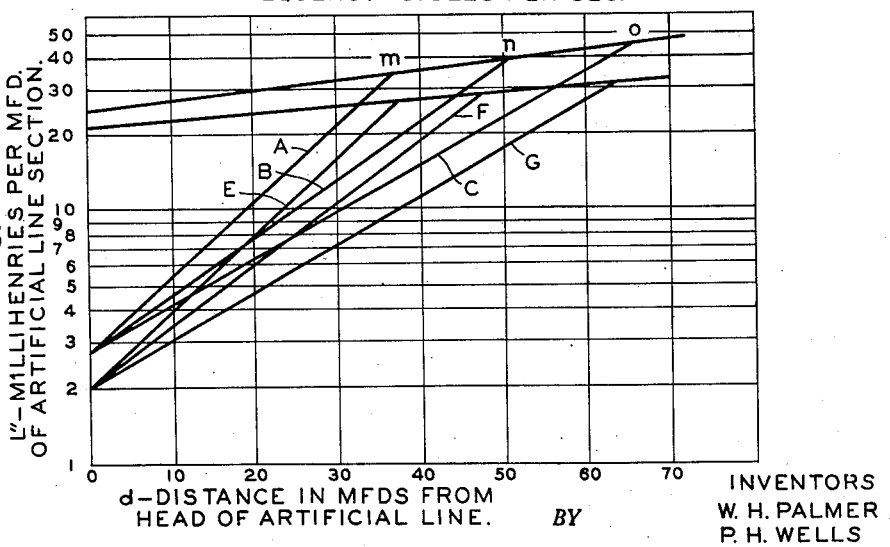

Fig. 3 includes curves which indicate the nature and magnitude of the inductance and resistance upon which the sea return impedance of a typical submarine cable depends;

Fig. 4 illustrates an assemblage of equipment useful in developing the empirical quantities necessary in order to balance a cable according to the invention;

Fig. 5 includes resistance and reactance unbalance curves obtained from the circuit of Fig. 4;

Fig. 6 presents a series of exponential taper curves which are developed according to the invention to govern the selection of values for the resistances to be introduced in series with the artificial line condensers.

Figure 1:
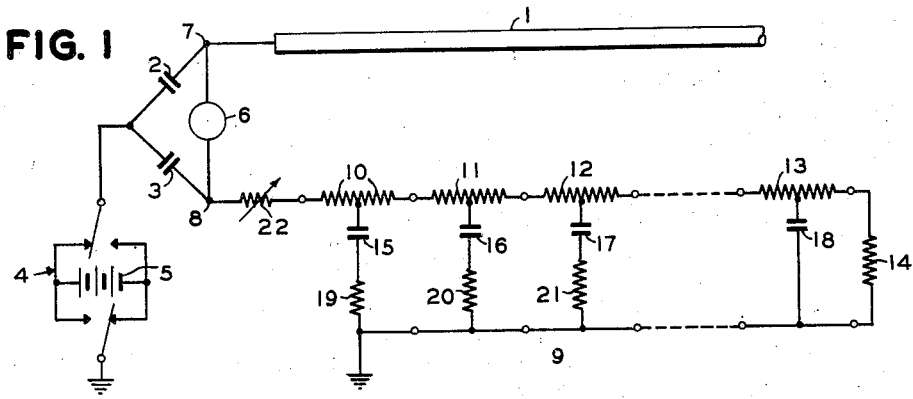
Fig. 1 is included to indicate the general features of a non-loaded submarine cable equipped with an improved artificial line according to the invention.

To assist in explaining the invention, reference will first be made to Fig. 1. In this figure, 1 represents a long submarine cable which is to be balanced according to the invention and 2 and 3 represent the block condensers which comprise the fixed arms of the duplex bridge. Signals may be transmitted over the cable by means of the transmitter shown schematically at 4 and including the battery 5. A receiver for receiving the signals sent from the distant end of the cable and for indicating unbalance potentials is shown generally at 6. This receiver may be of any preferred type; its character is not pertinent to the invention except that it should conform to the usual requirements among others of high sensitivity and freedom from extraneous interferences. The receiver 6 should be provided with measuring instrumentalities for measuring the potentials occurring across the diagonal points 7 and 8 of the duplex bridge as required in the course of adjusting the balance of the artificial line. The artificial line which is made up of a multiplicity of sections is shown generally at 9. Its basic elements comprise the series resistances 10, 11, 12, 13 and 14, which correspond to the series resistance of the cable, and the condensers 15, 16, 17 and 18, which simulate the shunt capacity of the cable. In series with certain of the condensers are the resistances 19, 20 and 21 which, as indicated, increase in value with distance from the head of the artificial line. The systematic manner in which this increase occurs is an important part of the present invention and will be described subsequently in detail. The variable resistance 22 located at the head of the artificial line is customarily provided for convenience in adjustment of the final balance.

In the customary procedure for balancing submarine cables the capacity and resistance per unit length of the cable are measured or computed and an artificial line is designed which will comprise a multiplicity of sections each bearing appropriate series resistance and shunt condenser values to simulate specified lengths of cable. At the head of the artificial line the required accuracy of balance is much higher and accordingly the lengths of the sections are relatively small, the condensers here having values of the order of one-half or one microfarad. In subsequent sections the condensers increase to three microfarads and in the final sections may be much larger. Following installation the balance is improved by making adjustments in the resistances and condensers of the artificial line, as well as other elements of the cable terminal, while observing in the receiver 6 the unbalance currents produced as test pulses are sent into the cable from the transmitter 5. A point is finally reached where no further improvement in balance is possible. The foregoing procedure is subject to complications caused by variations in types of cable which may be included in the makeup of a given submarine cable. The artificial line sections should, of course, vary in type in accordance with the change in the type of cable and, in particular, the junction points should be accurately placed.

The foregoing process is usually very tedious and time consuming but often the final adjustment does not provide a balance of sufficient accuracy to permit cable operation at the speeds which are demanded under modern traffic conditions. Although the capacity and resistance of the cable may be balanced with a reasonable degree of accuracy, an artificial line containing only series resistances and shunt condensers cannot accurately balance the variable inductance and resistance of the sea return impedance.

The curves of Fig. 3 illustrate the nature of this sea return impedance. Curve 23 represents the inductance of the cable which decreases in value with increase in frequency. Curve 24 represents the alternating current resistance of the cable which, it should be understood, is additional to the D. C. resistance. This value increases with frequency. It is apparent that any provision for balancing these characteristics of the cable should vary with frequency in the same manner but so far as we are aware this has not been accomplished in any practical and satisfactory manner prior to this invention. Previous schemes which have been proposed for simulating these properties of a cable involve the insertion of complex elements in the artificial line sections so that each section will more or less accurately duplicate a corresponding section of the cable. That is, the inductance and resistance of the cable as indicated in the curves of Fig. 3 is simulated on a per nautical mile basis. The present proposed method however requires only the insertion of simple resistances in a comparatively few sections at the head end of the artificial line and has the overall effect of modifying the sending end impedance of the artificial line by the amount indicated by the curves of Fig. 5, as will more fully appear hereinafter.

It has been stated that the inductance of a submarine cable can be simulated in the artificial line through the introduction of resistances in series with the shunt condensers. The correctness of this statement will now be proved.

Figure 2:
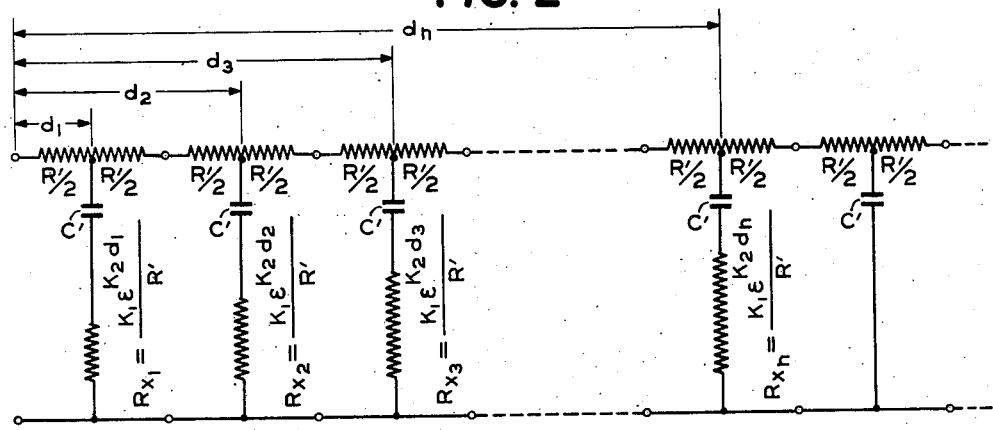
Fig. 2 represents in greater detail a portion of artificial line including several sections to which the invention has been applied.

In Patent 1,519,870 granted to J. W. Milnor on December 16, 1924, it was shown that the impedance of an artificial line network such as that shown in Fig. 2, but in which all $R_x$ values are equal, and are applied throughout the whole length of the artificial line, is:

$$Z = \sqrt{\frac{R'}{j2\pi f C'} + R' R_x + \frac{R'^2}{4}}$$

where $R'$, $C'$, $R_x$ have the significance indicated in Fig. 2. It was also shown that the impedance of the cable is equal to:

$$Z_0 = \sqrt{\frac{R + j\omega L}{j\omega C}} = \sqrt{\frac{R}{j\omega C} + \frac{L}{C}}$$

Where
$R$=resistance of the cable per mile in ohms.
$C$=capacity of the cable per mile in farads.
$L$=inductance of the cable per mile in henrys.
$\omega = 2\pi \times$ frequency.
$j = \sqrt{-1}$ It is apparent then that the artificial line will correctly balance the cable for all frequencies assuming that R and L remain constant, when $$\frac{R'}{C'} = \frac{R}{C}$$

and $$R'R_x + \frac{R'^2}{4} = \frac{L}{C}$$

or $$R_x = \frac{L}{R'C} - \frac{R'^2}{4}$$

In the last foregoing expression the term $$\frac{R'^2}{4}$$

represents the error due to the lumpiness, or the departure from a perfectly smooth line, of the artificial line. Since the quantity $$\frac{R'^2}{4}$$

is small compared to $$\frac{L}{R'C'}$$

it may for practical purposes be neglected and the expression reduces to $$R_x = \frac{L}{R'C} \qquad (1)$$

becoming exact as the section lengths approach zero.

Hence for small section lengths the fixed series inductance of a section of cable may be simulated in the corresponding section of the artificial line network by inserting resistances $R_x$ in series with the artificial line condensers in accordance with the above equation.

The principle of Patent 1,519,870 has proved useful under certain circumstances, however, it possesses limitations in that while it provides a balance of the fixed inductance of the cable over a wide frequency range, it does not simulate the variable inductance or the variable alternating current resistance which together make up the sea return impedance of the cable. It is at this point that our invention may be applied as an improved alternative to other methods of simulating these variable quantities.

It is known that if a small impedance $\Delta Z$ is added in series with a line at any point its effect at the terminal or head end of the line for any one frequency may be represented by the expression $\Delta Z \epsilon^{-2pl}$, where $\epsilon = 2.71828$ and $pl$ is the propagation constant for the portion of line preceding the point where $\Delta Z$ is added. In other words in the present artificial line an impedance $\Delta Z$ inserted into the line at a distance from the head end may be represented by a series impedance of value $\Delta Z \epsilon^{-2pl}$ located at the head of the line. Further, the general summation of a series of such intermediate impedances as viewed from the head end of the line would be:

$$\Delta Z = R_H + jX_H = \Delta Z_1 \epsilon^{-2pl_1} + Z_2 \epsilon^{-2pl_2} + \Delta Z_3 \epsilon^{-2pl_3} + \ldots \Delta Z_n \epsilon^{-2pl} \qquad (2)$$

where $\Delta Z_1$, $\Delta Z_2$, etc., represent the several impedances inserted at distances $l_1$, $l_2$, etc., from the head of the artificial line, $p$ is the propagation constant per unit length and $R_H + jX_H$ are the real and imaginary components respectively of the impedance of the equivalent head end network.

It is also true, with certain exceptions, that a network having an impedance $R_H + jX_H$ located in series with the head of the artificial line may be simulated at any one frequency by a series of suitably chosen impedance networks introduced at selected intermediate points in the line.

The foregoing considerations emphasize two points, first, a given impedance located at the head of an artificial line is equivalent to another impedance, or series of impedances of selected characteristics located at predetermined intermediate points in the artificial line. Second, in a section of artificial line an indicated series inductance can be simulated by a resistance in series with the shunt condenser. As suggested by the above statements, it appears that when a head end impedance network of certain value will provide a satisfactory balance of the cable impedance at a particular frequency it is possible to translate the head end network into a series of distributed resistances, located in series with the shunt condensers of predetermined sections of the artificial line and still retain the same balance. In the present invention this conception is carried even farther. We have discovered that through appropriate choice of the size of the resistances and their distribution an effective impedance component variable with frequency according to a prescribed pattern can be imparted to the artificial line. We have discovered further a method for determining a system of resistance units such that the artificial line will possess a variable impedance component which is equivalent at each frequency over the working frequency range to that head end impedance which would be necessary to match the cable inductance at that frequency. The invention is then a practical utilization of the concept of the summation at the head end of an artificial line of a series of impedances located at intermediate points in the artificial line, each modified according to the double propagation constant $\epsilon^{-2pl}$.

The procedure for determining the size of each of the series of condenser resistances, which have been called $R_x$, will now be outlined. It is more convenient to develop these values by a combined laboratory and computational process than to develop them from a mathematical analysis entirely. Further, by this method the artificial line may be designed with a considerable degree of completeness without the necessity of withdrawing the cable from service for purposes of measurement and test. The procedure is preferably carried out in five steps outlined briefly as follows: For the first step in balancing the cable set up two identical resistance-capacity artificial lines each representing the cable which is to be balanced. This circuit will be as indicated in Fig. 4 where artificial line 30 will be used to represent the cable and will include artificial line sections comprising resistances 31, 32, 33 and 34 and condensers 35, 36, 37 and 38, and the terminating resistance 39. At the head of the cable is inserted a variable inductance 41 and a variable resistance 42 arranged to be short-circuited by a switch 43. The function of these three elements will appear in later steps in the process. Artificial line 44 is identical with artificial line 30 and is made up of resistance elements numbered 45 to 49, inclusive, and capacity elements numbered 50 to 53, inclusive. Terminal equipment for the test circuit includes the block condensers 54 and 55, pulse transmitter 56 and variable frequency sine wave transmitter 57. Either transmitter may be connected to the cable by means of a switch 58, A receiving device 59, is provided which may be an oscilloscope or a milliammeter as needed, in connection with an amplifier of appropriate gain. With the switch 43 closed and using preferably the pulse method of balancing, artificial line 44 should be adjusted systematically to a high degree of balance for line 30.

The next step is to plot from available impedance data for the cable to be balanced, including sea return impedance, resistance and reactance curves for the cable impedance covering the working range of frequencies. The data for these curves may also be obtained by direct measurement of the cable using conventional methods. In this step there will be obtained reactance and A. C. resistance quantities corresponding to those shown in the curves of Figs. 10 and 11 of Patent 1,815,629, issued July 21, 1931, to J. W. Milnor et al., except that in the present instance head end impedance properties are being considered rather than impedances in terms of nautical miles.

In step No. 3 similar resistance and reactance curves as regards resistance and capacity only should be calculated for the cable, or the data may be obtained by measuring one of the artificial lines of Fig. 4.

In the fourth step the impedance curves obtained in step No. 3 should be subtracted from those obtained in step No. 2. The difference between these two sets of curves will represent the unbalance between the real cable and a balancing artificial line composed of resistance and capacity only such as artificial line 44 in Fig. 4. Such a set of unbalance curves is indicated in Fig. 5 where curve 70 represents the resistance component and the curve 71 represents the inductive reactance. It is apparent now that if a reactive network which possessed the variable resistance and reactance characteristics of curves 70 and 71 was inserted at the head of the artificial line the real cable would be balanced over the indicated frequency range. It has not been found practicable however to construct a network which will possess these desired impedance values over such a wide frequency range. The method of the invention however avoids the determination of such a network and provides rather a means for simulating its effect. If now in Fig. 4 the switch 43 is opened so as to include the variable elements 41 and 42 in series with artificial cable 30, and switch 58 is thrown so as to connect the cable to the variable frequency oscillator 57, resistance and inductance simulating means can be introduced into artificial cable 44 to match frequency by frequency the variable elements 41 and 42 as they are adjusted to the different values corresponding to curves 70 and 71 of Fig. 5. If the means is such as to afford a close simulation to all the curve values as represented by the variable network then a close balance has been obtained for the entire frequency range. In the next step therefore the nature of the impedance simulating means will be developed.

Having now developed the impedance characteristics for a network which would be necessary at the head of an artificial line in order to balance the sea return impedance of a real cable, and having shown that this impedance may be represented by a series of impedances distributed in the artificial line it will now be shown how such distributed impedances may be represented by a system of resistances $R_x$ located in series with the artificial line condensers.

Equation 1 stated that effective inductance would be introduced into a section of artificial line by means of a resistance $R_x$ such that $$R_x = \frac{L}{R'C} \tag{1}$$

where $R'$ is the resistance of the length of cable which is to be represented by the section of artificial line, but $L$ and $C$ represent respectively the resistance and capacity of the cable per unit length. The equation can also be written $$R_x = \frac{L'}{R'C'} \tag{3}$$

where $L'$ and $C'$ are now the inductance and capacity respectively of the length of cable represented by the section of artificial line. Under this relationship the values of $R_x$ remain constant, varying only if the chosen length of the artificial line section varies. It is a principal feature of the present invention, however, to provide a systematic variation in the values of $R_x$ from section to section of the artificial line. According to this variation as determined from experience with a large number of cables the values of $R_x$ increase from the head end of the artificial line in conformity with an exponential taper relationship which may be quite accurately defined for each cable. The procedure for defining this taper will now be explained.

An exponential curve if drawn on semi-log paper appears as a straight line and can be represented by the expression $$L'' = k_1 \epsilon^{k_2 d} \tag{4}$$

where $k_1$ and $k_2$ are constants and $d$ represents the abscissa. $k_1$ is the value of $L''$ at $d=0$, and $k_2$ represents the slope of the curve. Let such a curve be drawn as curve A of Fig. 6 in which the abscissae represent distances from the head of the artificial line and the ordinates represent inductance per unit length. In both cases, for convenience, microfarads are used as units of length instead of miles distance since artificial line sections are usually so designated. This curve is not directly related to the inductance of the cable but represents rather the amount of inductance which is to be simulated in artificial line sections at various distances from the head of the artificial line. As previously explained, the inductance will be simulated by means of the resistances $R_x$.

To convert the required inductance per artificial line section as indicated by the curves of Fig. 6 into $R_x$ values, and remembering that $L$ = henrys per mile of cable.
$L'$ = henrys per artificial line section.
$L''$ = henrys per microfarad of artificial line section.

we have $$R_x = \frac{L'}{R'C'}$$

Also $$L' = L''C'$$

Therefore $$R_x = \frac{L''C'}{R'C'} = \frac{L''}{R'}$$

and since $$L'' = k_1 \epsilon^{k_2 d}$$

$$R_x = \frac{k_1 \epsilon^{k_2 d}}{R'} \tag{5}$$

Now using Equation 5 compute values of the resistance $R_x$ for insertion in, say, the first ten artificial line sections according to curve A. Reference to Fig. 2 will be helpful in this computation. These resistances should now be installed in order in series with condensers 50, 51, 52, etc. of artificial line 44 of Fig. 4, and data for unbalance curves corresponding to curves 70 and 71 should again be taken and in the same manner. If curve A was properly chosen a substantial improvement in balance should result but minor readjustments possibly may be made to advantage. In particular, the series may be extended to additional sections until a distance is reached where further balance improvement is nil. Next a second trial taper curve such as C, using the same origin but of different slope should be drawn and new unbalance curves constructed. Comparison with the data taken under curve A will indicate if further improvement resulted, and where a third trial taper curve B, if desired, should be drawn. These few trials should indicate the location of the taper curve which will give the best possible balance and should also establish the length of the taper series by means of the points $m$, $n$, $o$, beyond which further improvement was impossible. This boundary may be specified by curve D. The final unbalance curves may be of the order of curves 72 and 73 of Fig. 5, but in general further work will be necessary in order to secure this degree of improvement.

The family of curves, A, B and C of Fig. 6 are all represented by the expression $L''=k_1 e^{k_2 d}$ but with different values of $k_2$, $k_1$ remaining unchanged. The foregoing process should now be repeated but using a new value of $k_1$ to create a second family of curves such as curves E, F, G, H and this may be repeated even a third time until no further balance improvement seems possible. Through work of this kind on a large number of different cable types we have been able to establish that the constant $k_1$ which specifies the zero intercept of the taper curve is determined by the sea return impedance of the cable while the constant $k_2$ which specifies the slope is a function of the resistance-capacity ratio, R/C. In the first instance the best arrangement must be arrived at through a procedure approximately as outlined, but after $k_1$ and $k_2$ values have been determined for a number of cable types varying as regards both $Z_0$ and R/C it is then possible by extrapolation to approximate the values for related cable types.

We are now ready to apply the series of tapered resistances according to the system just developed to the artificial line in the cable station which balances the real cable. Frequently, a certain amount of minor adjustment is required at this time. This usually is a result of inadequacy of the experimental data covering the characteristics of the cable and the artificial line. Further difficulty is introduced in practical cases by the presence in the cable of sections of different make-up. The process of balancing a submarine cable is a highly specialized one and in making the final adjustments experience is drawn upon in a very large degree. A balance accuracy of one part in 25,000 is customary in this kind of work but it is only obtainable with carefully designed networks adjusted by persons particularly skilled in this art.

Introduction of the $R_x$ resistances is not without effect on the propagation constant for the artificial line. However, the effect remains small because only a few sections are involved, and at the low frequencies here under consideration the insertion of several hundred ohms in series with a condenser of one or two microfarads does not greatly add to the impedance of the condenser circuit.

The validity of the tapered series of $R_x$ resistances selected according to an exponential law is real and significant. This is apparent from the fact that the final best balance when systematically arrived at admits of no further improvement through fortuitous adjustment of artificial line elements other than minor perfecting adjustments, whereas in the usual case a number of equivalent balances are possible because previous errors may be to some extent compensated by introduction of other errors. Further, the sum of the effective intermediate impedances introduced by the resistances $R_x$ as viewed from the head of the artificial line is found to be in fact equal to the impedance difference curves 70 and 71 of Fig. 5, as prescribed by Equation 2. Other taper systems, we have found, may lend a certain amount of improvement but the adjustments are fortuitous rather than systematic and lead only to accidental improvement. Further, there is no consistent relationship between cable characteristics and artificial line value, nor between cables having certain characteristics in common. On such a basis it is not possible to accumulate a fund of data which may be reliably drawn upon in the balancing of other cables.

The foregoing development has concerned itself only with a single series of $R_x$ resistances starting with the first section of the artificial line. Usually this single series if carefully selected will substantially exhaust the possibilities of improvement obtainable by this method. However, in some cases additional taper series located in more distant portions of the artificial line have sometimes been found helpful, particularly where the cable is made up of cores of different types. Such additional series are determined in the manner previously outlined but the values are likely to be less critical.

In applying the present invention some simplification may be achieved by joining together the ground leads of a small number of adjacent sections of condensers and carrying this common lead through a common $R_x$ resistance to ground. The value of the $R_x$ resistance is computed in the same manner as before, using the total series resistance and shunt capacity of the joined sections. So long as the total capacity involved is not too large the departure from the anticipated impedance curve is not serious.

In this specification we have described a modification in submarine cable artificial lines which provides a marked improvement in balance for non-loaded submarine cables, and have explained one method for designing artificial lines embodying this improvement. It should be understood, however, that our invention contemplates the application of the improvement to artificial lines and networks in other communication services, such as telephone lines. It is also within the scope of the invention to vary the disclosed method of designing artificial lines within wide limits as the circumstances of individual situations may prescribe.

What is claimed is:

1. An artificial line for balancing a submarine cable having shunt capacity and fixed series resistance, and also having series resistance and inductance variable with frequency comprising a plurality of sections each including shunt capacity and series resistance substantially equal to the shunt capacity and fixed series resistance of equivalent lengths of the cable, and also including means for balancing the variable resistance and inductance of the cable which comprises the introduction of resistances $R_x$ in series with the shunt capacity of a plurality of contiguous sections beginning with the head end section, said resistances $R_x$ increasing in value with distance from the head of the artificial line substantially in accordance with an exponential law.

2. An artificial line for balancing a submarine cable having shunt capacity and fixed series resistance, and also having series resistance and inductance variable with frequency comprising a plurality of sections each including shunt capacity and series resistance substantially equal to the shunt capacity and fixed series resistance of equivalent lengths of the cable, and also including means for balancing the variable resistance and inductance of the cable which comprises the introduction of resistances in series with the shunt capacity of a plurality of sections, said resistances increasing in value with distance from the head of the artificial line substantially in accordance with an exponential law.

3. In combination with a transmission line having shunt capacity and fixed series resistance, and also having series resistance and inductance variable with frequency, an artificial line for balancing said line comprising a plurality of sections each including shunt capacity and series resistance substantially equal to the shunt capacity and fixed series resistance of equivalent lengths of said line, and also including means for balancing the variable resistance and inductance of said line which comprises the introduction of resistances $R_x$ in series with the shunt capacity of a plurality of contiguous sections beginning with the head end section, said resistances $R_x$ increasing in value with distance from the head of the artificial line substantially in accordance with an exponential law.

4. The combination of claim 3 in which the artificial line has included therein, a second similar series of resistances $R_x$ tapering upward in value in accordance with an exponential law and beginning with an artificial line section distant from the head end section.

5. An artificial line including a tapered series of resistances $R_x$ in series with the shunt condensers of a plurality of sections, said taper conforming to the equation $$R_x = \frac{k_1 \epsilon^{k_2 d}}{R'}$$

where $R'$ is the resistance per section, $d$ is the distance from the head of the artificial line, $\epsilon = 2.71828$, $k_1$ is a function of the variable resistance and inductance of the cable and $k_2$ is a function of the fixed resistance-capacity ratio of the cable to be balanced.

6. An artificial line including a tapered series of resistances $R_x$ in series with the shunt condensers of a plurality of sections, said taper conforming to the equation $$R_x = \frac{k_1 \epsilon^{k_2 d}}{R'}$$

where $R'$ is the resistance per section, $d$ is the distance from the head of the artificial line, $\epsilon = 2.71828$, and $k_1$ and $k_2$ are constants derived from the characteristics of the cable to be balanced.

7. An impedance network comprising a plurality of sections each including shunt capacity, a fixed series resistance and means for simulating a variable resistance and inductance which comprises the introduction of resistances $R_x$ in series with the shunt condensers of a plurality of contiguous sections beginning with the head end section, said resistances $R_x$ increasing in value with distance from the head of the network substantially in accordance with an exponential law.

8. A network including a tapered series of resistances $R_x$ in series with the shunt condensers of a plurality of sections as in claim 7, said taper conforming substantially to the equation $$R_x = \frac{k_1 \epsilon^{k_2 d}}{R'}$$

where $R'$ is the resistance per section, $d$ is a function of the distance from the head of the network, $\epsilon = 2.71828$, $k_1$ is a function of the variable resistance and inductance to be simulated and $k_2$ is a function of the fixed resistance-capacity ratio of the network sections.

9. An artificial line for balancing a submarine cable having shunt capacity and fixed series resistance, and also having series resistance and inductance variable with frequency comprising a plurality of sections each including shunt capacity and series resistance substantially equal to the shunt capacity and fixed series resistance of equivalent lengths of the cable, and also including means for balancing the variable resistance and inductance of the cable which comprises the introduction of resistances $R_x$ in series with the shunt capacity of a plurality of adjacent groups of contiguous sections beginning with the head end section, said resistances $R_x$ increasing in value with distance from the head of the artificial line substantially in accordance with an exponential law.

WILLIAM H. PALMER.
PHILIP H. WELLS.

REFERENCES CITED

The following references are of record in the file of this patent:

UNITED STATES PATENTS

| Number | Name | Date |
|---|---|---|
| 1,519,870 | Milnor | Dec. 16, 1924 |
| 1,570,215 | Fry | Jan. 19, 1926 |
| 1,601,037 | Nyquist | Sept. 28, 1926 |
| 1,815,629 | Milnor et al. | July 21, 1931 |
| 1,843,226 | Herbig | Feb. 2, 1932 |